(12) United States Patent
Sakakibara (10) Patent No.: US 11,084,384 B2
(45) Date of Patent: Aug. 10, 2021

(54) POWER SUPPLY UNIT (71) Applicant: TOYOTA JIDOSHA KABUSHIKI KAISHA, Aichi-ken (JP)

(72) Inventor: Kazuhiko Sakakibara, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/017,689

(22) Filed: Sep. 11, 2020

(65) Prior Publication Data

US 2021/0170884 A1 Jun. 10, 2021

(30) Foreign Application Priority Data

Dec. 6, 2019 (JP) .............................. JP2019-221141

(51) Int. Cl.
*G06F 13/14* (2006.01)
*B60L 50/51* (2019.01)
*B60L 50/60* (2019.01)

(52) U.S. Cl.
CPC .............. *B60L 50/51* (2019.02); *B60L 50/60* (2019.02); *B60L 2210/10* (2013.01); *B60L 2210/40* (2013.01)

(58) Field of Classification Search
None
See application file for complete search history.

(56) References Cited

U.S. PATENT DOCUMENTS

| 8,802,323 | B2* | 8/2014 | Hemmes | H01M 8/222 429/504 |
| 8,916,300 | B2* | 12/2014 | McElroy | H01M 8/04156 429/411 |
| 2007/0000789 | A1* | 1/2007 | Libby | C25B 15/02 205/637 |
| 2012/0297104 | A1* | 11/2012 | Thottuvelil | G06F 13/4004 710/305 |

(Continued)

FOREIGN PATENT DOCUMENTS

JP 2015226341 A 12/2015

OTHER PUBLICATIONS

Toyota Gijutsukokaishu No. 33701, issued Mar. 31, 2020, 5pp.

(Continued)

*Primary Examiner* — Jared Fureman
*Assistant Examiner* — Esayas G Yeshaw
(74) *Attorney, Agent, or Firm* — Hauptman Ham, LLP (57) ABSTRACT

A power supply unit includes an electronic control unit that executes; a first control for controlling first and second converters such that a voltage of the load power line becomes a predetermined voltage by driving the first converter in a state where the second converter is stopped, and a second control for controlling the first and second converters such that the voltage of the load power line becomes the predetermined voltage by driving the second converter in a state where the first converter is stopped. The electronic control unit is configured to, when shifting from first to second control, control the first and second converters such (Continued)

that the voltage of the load power line becomes the predetermined voltage by driving the second converter, and stop the first converter after an output current of the first converter has become less than a predetermined current.

3 Claims, 4 Drawing Sheets

(56) References Cited

U.S. PATENT DOCUMENTS

| | | | |
|---|---|---|---|
| 2013/0249283 A1* | 9/2013 | Yokoyama | B60L 1/00 307/10.1 |
| 2015/0340884 A1 | 11/2015 | Suzuki et al. | |
| 2016/0352111 A1* | 12/2016 | Arita | H01M 10/4207 |
| 2017/0080810 A1* | 3/2017 | Choi | B60L 53/20 |
| 2018/0222333 A1* | 8/2018 | Khaligh | B60L 53/22 |
| 2020/0169217 A1* | 5/2020 | Oomori | H02S 40/32 |

OTHER PUBLICATIONS

Unpublished U.S. Appl. No. 17/096,965, filed Nov. 13, 2020, 36pp.
Unpublished U.S. Appl. No. 17/114,371, filed Dec. 7, 2020, 21pp.

\* cited by examiner

POWER SUPPLY UNIT

CROSS REFERENCE TO RELATED APPLICATION

This application claims priority to Japanese Patent Application No. 2019-221141 filed on Dec. 6, 2019, incorporated herein by reference in its entirety.

BACKGROUND

1. Technical Field

The disclosure relates to a power supply unit, and more particularly, to a power supply unit that supplies power from a power source to a load that operates at a voltage different from a voltage of the power source.

2. Description of Related Art

In the related art, as this type of power supply unit, a unit including first and second batteries and a relay has been proposed (for example, Japanese Unexamined Patent Application Publication No. 2015-226341 (JP 2015-226341 A). The first battery is connected to an alternator and a first load (auxiliary device). The second battery is connected to a second load (auxiliary device). The relay connects and disconnects the first battery and the second battery to and from each other. In the unit, when a state of charge (SOC) of the second battery decreases, the connection between the first battery and the second battery by the relay is released. Then, when a connection request for connecting the first battery and the second battery to each other is made by the relay, the alternator is controlled such that a voltage difference between an inter-terminal voltage of the first battery and an inter-terminal voltage of the second battery becomes equal to or less than a threshold, and when the voltage difference between the inter-terminal voltage of the first battery and the inter-terminal voltage of the second battery becomes equal to or less than the threshold, the relay connects the first battery and the second battery to each other. By such control, when two batteries are connected, a current is suppressed from flowing from a battery having a high inter-terminal voltage to a battery having a low inter-terminal voltage, and energy loss due to such a current is suppressed.

SUMMARY

Incidentally, as a power supply unit that supplies power from a power source to a load that operates at a voltage different from a voltage of the power source, a unit that includes a first converter and a second converter and does not include a power storage unit connected to a load is proposed. The first converter is connected between the power source and the load, and supplies the power from the power source to the load with conversion of the voltage. The second converter is more efficiently driven at a low current compared to the first converter, is connected between the power source and the load in parallel to the first converter, and supplies the power from the power source to the load with conversion of the voltage. In the unit, energy efficiency is improved by switching the converter to be driven, of the first converter and the second converter. When switching converters as described above, the voltage supplied to the load may fluctuate. In the above-described power supply unit in the related art, since the configuration of the power supply unit to be controlled is different, it is not possible to cope with such fluctuations in the voltage supplied to the load.

The power supply unit according to an aspect of the disclosure suppresses the fluctuations in the voltage supplied to the load.

An aspect of the disclosure relates to a power supply unit that supplies power from a power source to a load that operates at a voltage different from a voltage of the power source. The power supply unit includes a first converter, a second converter, and an electronic control unit. The first converter is connected between the power source and a load power line connected to the load, and is configured to supply the power from the power source to the load power line with conversion of the voltage. The second converter is configured to be more efficiently driven at a low current compared to the first converter, is connected between the power source and the load power line in parallel to the first converter, and is configured to supply the power from the power source to the load power line with conversion of the voltage. The electronic control unit is configured to execute a first control and a second control while switching between the first control and the second control. The first control is for controlling the first converter and the second converter such that a voltage of the load power line becomes a predetermined voltage by driving the first converter in a state where the second converter is stopped. The second control is for controlling the first converter and the second converter such that the voltage of the load power line becomes the predetermined voltage by driving the second converter in a state where the first converter is stopped. The electronic control unit is configured to, when shifting from the first control to the second control, control the first converter and the second converter such that the voltage of the load power line becomes the predetermined voltage by driving the second converter while gradually decreasing an output voltage of the first converter, and stop the first converter after an output current of the first converter has become less than a predetermined current.

In the aspect, the first converter and the second converter are provided. The first converter is connected between the power source and a load power line connected to the load, and is configured to supply the power from the power source to the load power line with conversion of the voltage. The second converter is configured to be more efficiently driven at a low current compared to the first converter, is connected between the power source and the load power line in parallel to the first converter, and is configured to supply the power from the power source to the load power line with conversion of the voltage. According to the aspect, the power from the power source is supplied to the load to drive the load without connecting a power storage unit to the load. Then, the first control and the second control are executed while switching between the first control and the second control. The first control is for controlling the first converter and the second converter such that the voltage of the load power line becomes a predetermined voltage by driving the first converter in a state where the second converter is stopped. The second control is for controlling the first converter and the second converter such that the voltage of the load power line becomes the predetermined voltage by driving the second converter in a state where the first converter is stopped. The energy efficiency is improved by switching between the first control and the second control. When the first converter is immediately stopped at the time of shifting from the first control to the second control, the power supplied to the load power line via the first converter suddenly becomes zero, and the output request to the second converter rapidly increases. At this time, the response of the second converter may be delayed and the voltage supplied to the load power line, that is, the voltage supplied to the load may fluctuate. In consideration of such circumstances, in the aspect, when shifting from the first control to the second control, the first converter and the second converter are controlled such that the voltage of the load power line becomes the predetermined voltage by driving the second converter while gradually decreasing an output voltage of the first converter, and the first converter is stopped after an output current of the first converter has become less than a predetermined current. As a result, when shifting from the first control to the second control, it is possible to suppress fluctuations in the voltage supplied to the load.

The power supply unit according to the aspect may further include a first relay and a second relay. The first relay is configured to enable supply of the power from the power source to the load via the first converter, and cut-off of the supply of the power from the power source to the load via the first converter. The second relay is configured to enable supply of the power from the power source to the load via the second converter, and cut-off of the supply of the power from the power source to the load via the second converter. The electronic control unit may be configured to, in the first control, control the first relay and the second relay such that the power is supplied from the power source to the load via the first converter, and the supply of the power from the power source to the load via the second converter is cut off; and, in the second control, control the first relay and the second relay such that the power is supplied from the power source to the load via the second converter, and the supply of the power from the power source to the load via the first converter is cut off. The electronic control unit may be further configured to, when shifting from the first control to the second control, control the first converter and the second converter such that the voltage of the load power line becomes the predetermined voltage by driving the second converter while gradually decreasing the output voltage of the first converter in a state where the first relay and the second relay are controlled such that the power is supplied from the power source to the load via the first converter and the second converter, and control the first relay such that the supply of the power from the power source to the load via the first converter is cut off after the output current of the first converter has become less than the predetermined current.

According to the aspect, since, in the first control, the first relay and the second relay are controlled such that the power is supplied from the power source to the load via the first converter, and the supply of the power from the power source to the load via the second converter is cut off, it is possible to reliably cut off the power supplied to the load via the second converter. Since, in the second control, the first relay and the second relay are controlled such that the power is supplied from the power source to the load via the second converter, and the supply of the power from the power source to the load via the first converter is cut off, it is possible to reliably cut off the power supplied to the load via the second converter. Further, since, when shifting from the first control to the second control, the first relay is controlled such that the supply of the power from the power source to the load via the first converter is cut off after the output current of the first converter has become less than the predetermined current, it is possible to reliably cut off the supply of the power from the power source to the load via the first converter.

Further, in the aspect, the power supply unit may be mounted on a vehicle, and the electronic control unit may shift from the first control to the second control at the time when the vehicle is stopped. While the vehicle is stopped, the requested current of the load is low in many cases. In such a case, the energy efficiency can be improved by shifting from the first control to the second control to drive the second converter that is efficient at a low current.

In the aspect, when shifting from the first control to the second control, the first converter and the second converter may be controlled such that the voltage of the load power line becomes the predetermined voltage by driving the second converter while decreasing the output voltage of the first converter at a predetermined rate. The "predetermined rate" may be a rate that is predetermined as a rate that does not affect the driving of the load. Thereby, it is possible to more appropriately reduce the output voltage of the first converter and suppress fluctuations in the voltage supplied to the load.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A preferred embodiment of the disclosure will be described below using an embodiment.

Figure 1:
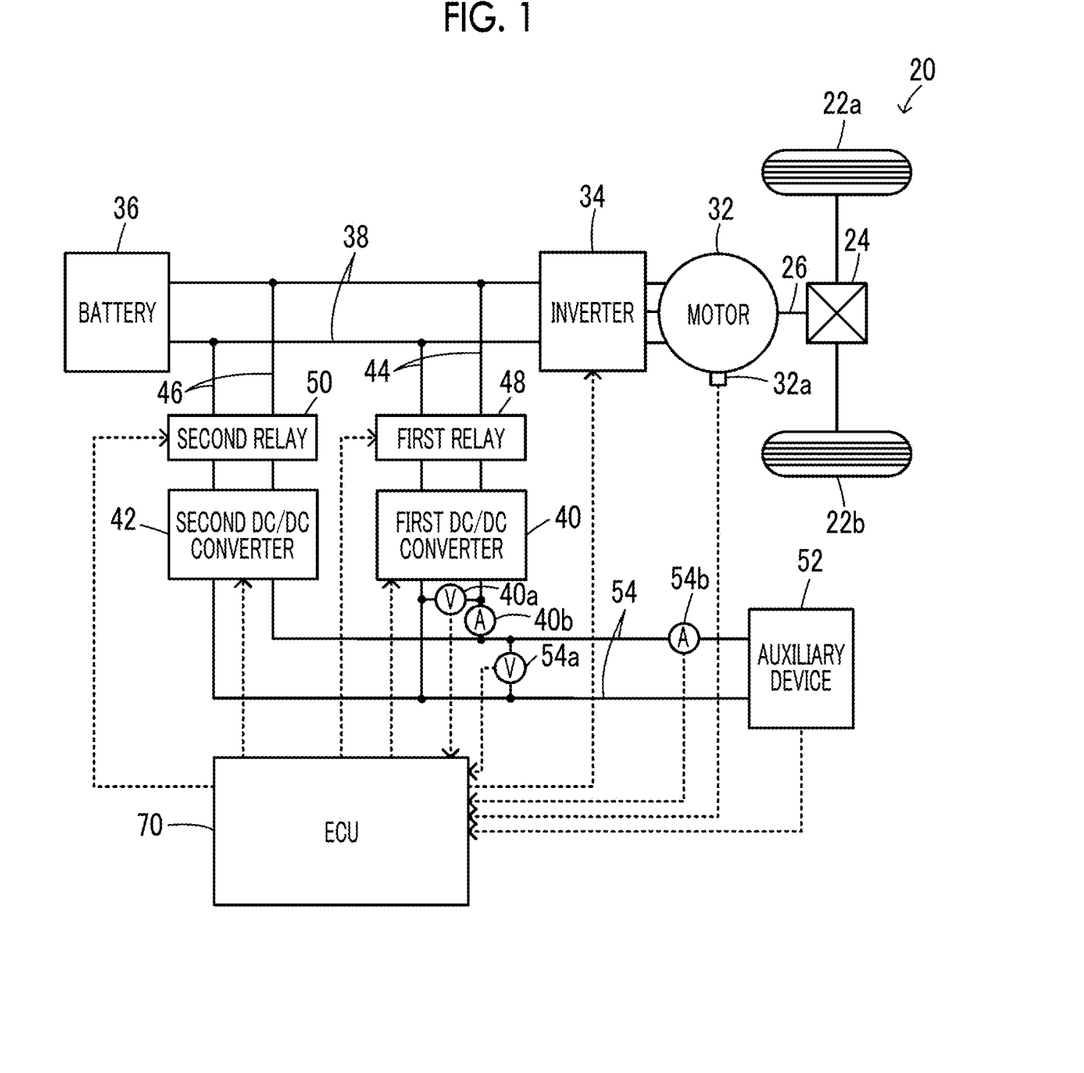
FIG. 1 is a configuration diagram illustrating an outline of the configuration of an electric vehicle equipped with a power supply unit as an embodiment of the disclosure.

FIG. 1 is a configuration diagram illustrating an outline of the configuration of an electric vehicle 20 equipped with a power supply unit as an embodiment of the disclosure. As illustrated, the electric vehicle 20 according to the embodiment includes a motor 32, an inverter 34, a battery 36, a first DC/DC converter 40, a second DC/DC converter 42, a first relay 48, a second relay 50, and an electronic control unit (hereinafter, referred to as an "ECU") 70.

The motor 32 is configured as a synchronous motor generator and includes a rotor in which a permanent magnet is embedded and a stator around which a three-phase coil is wound. The rotor of the motor 32 is connected to a drive shaft 26 connected to drive wheels 22a, 22b via a differential gear 24.

The inverter 34 is connected to the motor 32 and is also connected to a high voltage system power line 38. The inverter 34 is configured as a well-known inverter circuit having six transistors and six diodes.

The battery 36 is configured as, for example, a lithium ion secondary battery or a nickel hydrogen secondary battery, and is connected to the high voltage system power line 38.

The first DC/DC converter 40 is connected to a first power line 44 connected to the high voltage system power line 38, and a low voltage system power line 54 connected to an auxiliary device 52 that operates at a voltage lower than the rated voltage of the battery 36. The first DC/DC converter 40 is configured as a well-known step-down converter, and steps down power of the first power line 44 to supply the power to the low voltage system power line 54.

The second DC/DC converter 42 is connected to a third power line 46 connected to the high voltage system power line 38, and the low voltage system power line 54. The second DC/DC converter 42 is configured as a well-known step-down converter, and steps down power of the third power line 46 to supply the power to the low voltage system power line 54.

In the embodiment, the second DC/DC converter 42 has a characteristic that it is more efficiently driven at a low current compared to the first DC/DC converter 40. The second DC/DC converter 42 has a characteristic that it takes a relatively long time to start driving and output a certain amount of power.

The first relay 48 is attached to the first power line 44. The first relay 48 enables supply of power from the battery 36 to the auxiliary device 52 via the first DC/DC converter 40 when turned on, and cuts off the supply of the power from the battery 36 to the auxiliary device 52 via the first DC/DC converter 40 when turned off.

The second relay 50 is attached to the third power line 46. The second relay 50 enables supply of power from the battery 36 to the auxiliary device 52 via the second DC/DC converter 42 when turned on, and cuts off the supply of the power from the battery 36 to the auxiliary device 52 via the second DC/DC converter 42 when turned off.

The ECU 70 is configured as a microprocessor centered on a CPU (not illustrated), and includes, in addition to the CPU, a ROM for storing a processing program, a RAM for temporarily storing data, an input/output port, a communication port (all of which are not illustrated), and the like.

Signals from various sensors are input to the ECU 70 via input ports. Examples of the signals input to the ECU 70 include a rotational position Om from a rotational position detection sensor (for example, resolver) 32a that detects the rotational position of the rotor of the motor 32. An output voltage Vdc1 from a voltage sensor 40a that detects an output voltage (inter-terminal voltage) of the first DC/DC converter 40, an output current Idc1 from a current sensor 40b that detects an output current (terminal current) of the first DC/DC converter 40, a voltage VL from a voltage sensor 54a that detects a voltage of the low voltage system power line 54, or an auxiliary device current Ia from a current sensor 54b that detects a current supplied to the auxiliary device 52 can also be mentioned. Since the ECU 70 also functions as a drive power supply unit of a vehicle, information needed for travel control is also input. Although not illustrated, examples of the information include an ignition signal from an ignition switch, a shift position from a shift position sensor that detects an operation position of a shift lever, an accelerator operation amount from an accelerator pedal position sensor that detects the amount of depression of an accelerator pedal, a brake pedal position from a brake pedal position sensor that detects the amount of depression of a brake pedal, a vehicle speed from a vehicle speed sensor, and the like.

Various control signals are output from the ECU 70 via output ports. Examples of the signals output from the ECU 70 include a switching control signal to the transistor of the inverter 34, a drive control signal to the first DC/DC converter 40 and the second DC/DC converter 42, a drive control signal to the first relay 48 and the second relay 50, and the like.

In the thus configured electric vehicle 20 according to the embodiment, the ECU 70 controls the inverter 34 such that the vehicle travels by the motive power from the motor 32.

In the electric vehicle 20 according to the embodiment, while the vehicle is traveling, a first control for controlling the first DC/DC converter 40 and the second DC/DC converter 42 is executed such that the voltage VL of the low voltage system power line 54 becomes a rated voltage Va of the auxiliary device 52 by driving the first DC/DC converter 40 in a state where the first relay 48 is turned on, the second relay 50 is turned off, and the second DC/DC converter 42 is stopped. The first DC/DC converter 40 is more efficiently driven at a high current compared to the second DC/DC converter 42. Since the requested power (requested current) of the auxiliary device 52 is relatively large while the vehicle is traveling, the voltage VL of the low voltage system power line 54 is set to the rated voltage Va of the auxiliary device 52 by driving the first DC/DC converter 40 in the state where the second DC/DC converter 42 is stopped, and thereby the energy efficiency can be improved as compared with the case of driving the second DC/DC converter 42.

While the vehicle is stopped (including parking), a second control for controlling the first DC/DC converter 40 and the second DC/DC converter 42 is executed such that the voltage VL of the low voltage system power line 54 becomes the rated voltage Va of the auxiliary device 52 by driving the second DC/DC converter 42 in a state where the first relay 48 is turned off, the second relay 50 is turned on, and the first DC/DC converter 40 is stopped. The second DC/DC converter 42 is more efficiently driven at a low current compared to the first DC/DC converter 40. Since the requested power (requested current) of the auxiliary device 52 is relatively small while the vehicle is stopped, the voltage VL of the low voltage system power line 54 is set to the rated voltage Va of the auxiliary device 52 by driving the second DC/DC converter 42 in the state where the first DC/DC converter 40 is stopped, and thereby the energy efficiency can be improved as compared with the case of driving the first DC/DC converter 40.

Figure 2:
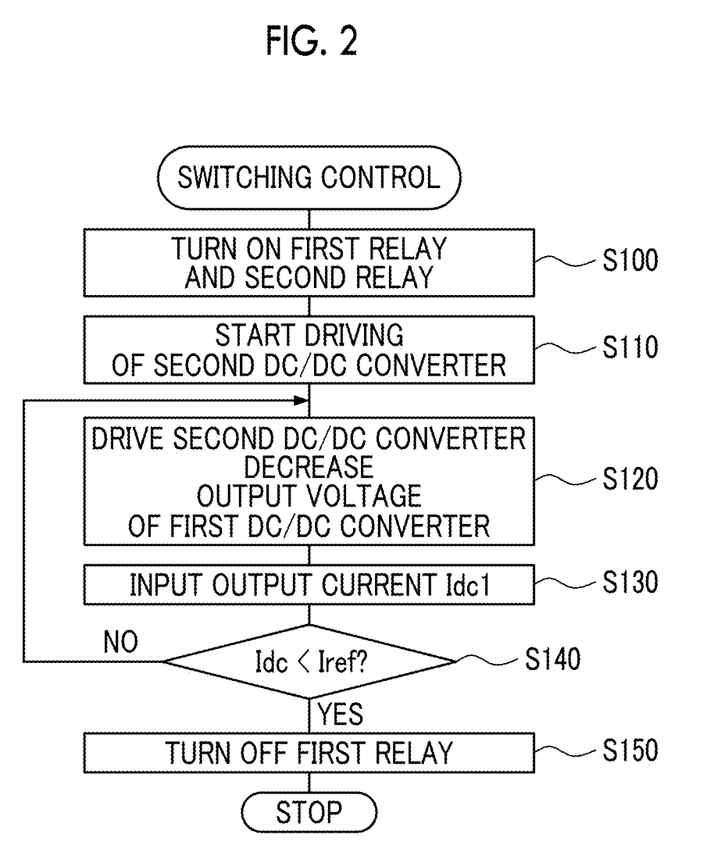
FIG. 2 is a flowchart illustrating an example of a switching control routine executed by an ECU.

Next, the operation of the thus configured electric vehicle 20 according to the embodiment, particularly the operation when the traveling vehicle stops and performs switching from the first control to the second control will be described. FIG. 2 is a flowchart illustrating an example of a switching control routine executed by the ECU 70. The present routine is executed at the time when the vehicle executing the first control during traveling is stopped. Therefore, before the execution of the present routine, the first control is executed, and thereby the first relay 48 is turned on and the second relay 50 is turned off.

When the present routine is executed, the ECU 70 turns on the second relay 50 with the first relay 48 turned on (step S100), starts driving the stopped second DC/DC converter 42 (step S110), and controls the second DC/DC converter 42 such that the voltage VL of the low voltage system power line 54 becomes the rated voltage Va of the auxiliary device 52 and controls the first DC/DC converter 40 such that the output voltage Vdc1 of the first DC/DC converter 40 decreases at a predetermined rate Rdc1 (step S120). The reason why such control is performed is as follows.

Figure 3:
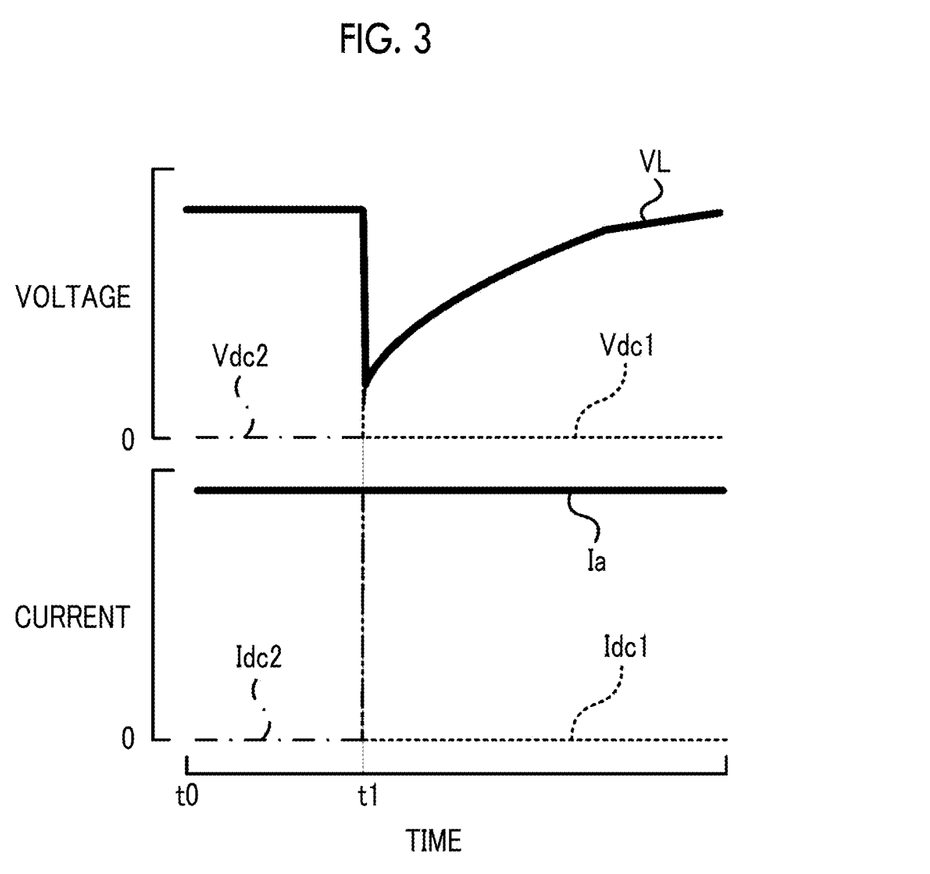
FIG. 3 is a graph illustrating an example of temporal changes in a terminal current (output current) of a first DC/DC converter, a terminal current (output current) of a second DC/DC converter, and an auxiliary device current when a requested current of an auxiliary device is constant, in a comparative example.
Figure 4:
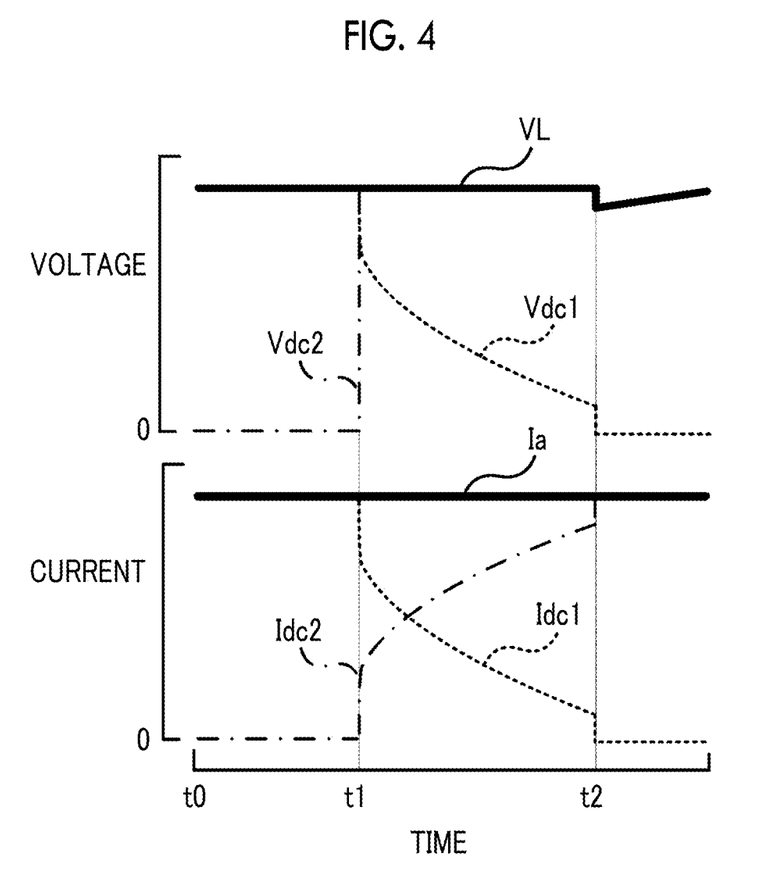
FIG. 4 is a graph illustrating an example of temporal changes in a terminal current (output current) of a first DC/DC converter, a terminal current (output current) of a second DC/DC converter, and an auxiliary device current when a requested current of an auxiliary device is constant, in the embodiment.

FIG. 3 is a graph illustrating an example of temporal changes in the output voltage Vdc1 and the output current Idc1 of the first DC/DC converter 40, an output voltage Vdc2 and an output current Idc2 of the second DC/DC converter 42, and the voltage VL and the auxiliary device current Ia of the low voltage system power line 54 when the requested power (requested current) of the auxiliary device 52 is constant, in a comparative example. In the comparative example, the first control shifts to the second control immediately after the vehicle stops. FIG. 4 is a graph illustrating an example of temporal changes in the output voltage Vdc1 and the output current Idc1 of the first DC/DC converter 40, the output voltage Vdc2 and the output current Idc2 of the second DC/DC converter 42, and the voltage VL and the auxiliary device current Ia of the low voltage system power line 54 when the requested power (requested current) of the auxiliary device 52 is constant, in the embodiment. In FIGS. 3 and 4, the dashed lines illustrate examples of temporal changes in the output voltage Vdc1 and the output current Idc1 of the first DC/DC converter 40. The one-dot chain lines illustrate examples of temporal changes in the output voltage Vdc2 and the output current Idc2 of the second DC/DC converter 42. The solid lines illustrate examples of temporal changes in the voltage VL of the low voltage system power line 54 and the auxiliary device current Ia.

In FIGS. 3 and 4, during time t0 to time t1, the temporal change in the output voltage Vdc1 of the first DC/DC converter 40 and the temporal change in the voltage VL of the low voltage system power line 54 coincide with each other, and the temporal change in the output current Idc1 of the first DC/DC converter 40 and the temporal change in the auxiliary device current Ia coincide with each other. In FIG. 3, after time t1, the temporal change in the output voltage Vdc2 of the second DC/DC converter 42 and the temporal change in the voltage VL of the low voltage system power line 54 coincide with each other, and the temporal change in the output current Idc2 of the second DC/DC converter 42 and the temporal change in the auxiliary device current Ia coincide with each other. In FIG. 4, after time t1, the temporal change in the output voltage Vdc2 of the second DC/DC converter 42 and the temporal change in the voltage VL of the low voltage system power line 54 coincide with each other. In FIG. 4, after time t2, the temporal change in the output current Idc2 of the second DC/DC converter 42 and the temporal change in the auxiliary device current Ia coincide with each other.

In the comparative example, as illustrated in FIG. 3, at the time when the vehicle is stopped (time t1), the first control immediately shifts to the second control. At this time, since the first relay 48 is turned off, the output voltage Vdc1 from the first DC/DC converter 40 suddenly becomes zero, and the second relay 50 is turned on to start driving the second DC/DC converter 42. As described above, the second DC/DC converter 42 takes a relatively long time to start driving and output a certain amount of power, and thus the voltage VL of the low voltage system power line 54 largely fluctuates (decreases).

In the embodiment, as illustrated in FIG. 4, at the time when the vehicle is stopped (time t1), the second relay 50 is turned on with the first relay 48 turned on, and the stopped second DC/DC converter 42 is started to be driven (steps S100 and S110). At this time, since the first DC/DC converter 40 is driven and holds the voltage VL of the low voltage system power line 54, it is possible to suppress the fluctuation of the voltage VL. Then, the second DC/DC converter 42 is controlled such that the voltage VL of the low voltage system power line 54 becomes the rated voltage Va of the auxiliary device 52 and the first DC/DC converter 40 is controlled such that the output voltage Vdc1 of the first DC/DC converter 40 decreases at the predetermined rate Rdc1 (time t1 to time t2, step S120). Thus, while the output voltage Vdc1 of the first DC/DC converter 40 is decreased at the predetermined rate Rdc1, the supply of the power from the first DC/DC converter 40 is continued until the second DC/DC converter 42 can output a certain amount of power. As a result, it is possible to suppress the fluctuation of the voltage VL of the low voltage system power line 54, that is, the voltage supplied to the auxiliary device 52. Here, as the predetermined rate Rdc1, in a state where a requested current of the auxiliary device 52 calculated from the power consumed by the auxiliary device 52 when the vehicle is stopped and the rated voltage Va of the auxiliary device 52, and a temporal change of the output power (output current) immediately after the driving of the second DC/DC converter 42 is started are obtained in advance by an experiment or an analysis, the predetermined rate Rdc1 is set corresponding to the rising time constant of the output power (output current) of the second DC/DC converter 42 such that the shortage of the current from the second DC/DC converter 42 with respect to the requested current of the auxiliary device 52 can be supplemented by the current from the first DC/DC converter 40.

When step S120 is executed, next, the output current Idc1 of the first DC/DC converter 40 is input from the current sensor 40b (step S130), and determination is made as to whether or not the output current Idc1 is less than a predetermined current Iref (step S140). The predetermined current Iref is a threshold for determining whether or not the driving of the auxiliary device 52 is affected when the first relay 48 is turned off and the current supplied to the auxiliary device 52 via the first DC/DC converter 40 is immediately set to zero, and is set to, for example, 80 mA, 100 mA, 120 mA, or the like.

When the output current Idc1 is equal to or greater than the predetermined current Iref in step S140, determination is made that the driving of the auxiliary device 52 is affected when the first relay 48 is turned off, and steps S120 to S140 are repeated until the output current Idc1 becomes less than the predetermined current Iref. At this time, the output current Idc1 of the first DC/DC converter 40 gradually decreases at the predetermined rate Rdc1.

Then, when the output current Idc1 is less than the predetermined current Iref in step S140, the first relay 48 is turned off (step S150), the present routine is ended, and the process shifts to the second control. Since the output power of the first DC/DC converter 40 becomes zero, the voltage VL of the low voltage system power line 54 may fluctuate (decrease) (time t2), but the fluctuation amount of the voltage VL of the low voltage system power line 54 is smaller than the fluctuation amount in the comparative example. As described above, in the embodiment, it is possible to suppress the fluctuation of the voltage VL of the low voltage system power line 54, that is, the voltage supplied to the auxiliary device 52.

With the power supply unit according to the embodiment described above, when shifting from the first control to the second control, the first DC/DC converter 40 and the second DC/DC converter 42 are controlled such that the voltage VL of the low voltage system power line 54 becomes the rated voltage Va of the auxiliary device 52 by driving the second DC/DC converter 42 while decreasing the output voltage Vdc1 of the first DC/DC converter 40 at the predetermined rate Rdc1 in a state where the first relay 48 and the second relay 50 are turned on, and the first relay 48 turned off after the output current Idc1 of the first DC/DC converter 40 has become less than the predetermined current Iref, thereby suppressing the fluctuation of the voltage supplied to the auxiliary device 52.

In the power supply unit according to the embodiment, the output voltage Vdc1 of the first DC/DC converter 40 is decreased at the predetermined rate Rdc1 in step S120. However, since the output voltage Vdc1 of the first DC/DC converter 40 may be gradually decreased, the output voltage Vdc1 of the first DC/DC converter 40 may be controlled so as to decrease along a curve with respect to time, for example.

The power supply unit according to the embodiment is mounted on the electric vehicle 20. However, instead of the electric vehicle 20, the power supply unit may be mounted on a power device including the first DC/DC converter 40, the second DC/DC converter 42, the first relay 48, and the second relay 50. In this case, when the current supplied to the auxiliary device 52 becomes higher than the predetermined current Iref and equal to or lower than a predetermined current Ith that drives the second DC/DC converter 42 more efficiently than the first DC/DC converter 40, the first control may be shifted to the second control.

In the power supply unit according to the embodiment, the rated voltage Va of the auxiliary device 52 is lower than the rated voltage of the battery 36, and the first DC/DC converter 40 and the second DC/DC converter 42 are configured as well-known step-down converters. However, when the rated voltage Va of the auxiliary device 52 is higher than the rated voltage of the battery 36, the first DC/DC converter 40 and the second DC/DC converter 42 may be configured as well-known step-up converters.

In the power supply unit according to the embodiment, the first relay 48 is attached to the first power line 44. However, since the first relay 48 may enable supply of power from the battery 36 to the auxiliary device 52 via the first DC/DC converter 40 when turned on, and cut-off of the supply of the power from the battery 36 to the auxiliary device 52 via the first DC/DC converter 40 when turned off, the first relay 48 may be attached between the output terminal of the first DC/DC converter 40 and the low voltage system power line 54.

In the power supply unit according to the embodiment, the second relay 50 is attached to the third power line 46. However, since the second relay 50 may enable supply of power from the battery 36 to the auxiliary device 52 via the second DC/DC converter 42 when turned on, and cut-off of the supply of the power from the battery 36 to the auxiliary device 52 via the second DC/DC converter 42 when turned off, the second relay 50 may be attached between the output terminal of the second DC/DC converter 42 and the low voltage system power line 54.

In the power supply unit according to the embodiment, the first relay 48 and the second relay 50 are attached to the first power line 44 and the third power line 46. However, the first relay 48 and the second relay 50 may not be attached thereto. In this case, in the first control, the first DC/DC converter 40 and the second DC/DC converter 42 may be controlled such that the voltage VL of the low voltage system power line 54 becomes the rated voltage Va of the auxiliary device 52 by driving the first DC/DC converter 40 in a state where the second DC/DC converter 42 is stopped. In the second control, the first DC/DC converter 40 and the second DC/DC converter 42 may be controlled such that the voltage VL of the low voltage system power line 54 becomes the rated voltage Va of the auxiliary device 52 by driving the second DC/DC converter 42 in a state where the first DC/DC converter 40 is stopped. In this case, in the switching control routine illustrated in FIG. 2, steps S110 to S140 may be executed without executing step S100, and the first DC/DC converter 40 may be stopped in step S150.

The correspondence between the primary components of the embodiment and the primary components of the disclosure described in the "SUMMARY" section will be described. In the embodiment, the first DC/DC converter 40 is an example of a "first converter", the second DC/DC converter 42 is an example of a "second converter", and the ECU 70 is an example of an "electronic control unit".

Since the embodiment is an example for specifically describing the preferred embodiment of the disclosure described in the "SUMMARY" section, the correspondence between the primary components of the embodiment and the primary components of the disclosure described in the "SUMMARY" section does not limit the components of the disclosure described in the "SUMMARY" section. That is, the interpretation of the disclosure described in the "SUMMARY" section should be made based on the description in that section, and the embodiment is merely a specific example of the disclosure described in the "SUMMARY" section.

Although the preferred embodiment of the disclosure has been described above using the embodiment, it is needless to say that the disclosure is not limited to such an embodiment and the disclosure can be implemented in various forms without departing from the scope of the disclosure.

The disclosure can be used in a manufacturing industry of the power supply unit and the like.

What is claimed is:

1. A power supply unit that supplies power from a power source to a load that operates at a voltage different from a voltage of the power source, the power supply unit comprising:

a first converter connected between the power source and a load power line connected to the load, and configured to supply the power from the power source to the load power line with conversion of the voltage;

a second converter configured to be more efficiently driven at a low current compared to the first converter, connected between the power source and the load power line in parallel to the first converter, configured to supply the power from the power source to the load power line with conversion of the voltage; and an electronic control unit configured to execute a first control and a second control while switching between the first control and the second control, the first control being for controlling the first converter and the second converter such that a voltage of the load power line becomes a predetermined voltage by driving the first converter in a state where the second converter is stopped, the second control being for controlling the first converter and the second converter such that the voltage of the load power line becomes the predetermined voltage by driving the second converter in a state where the first converter is stopped, wherein the electronic control unit is configured to, when shifting from the first control to the second control, control the first converter and the second converter such that the voltage of the load power line becomes the predetermined voltage by driving the second converter while gradually decreasing an output voltage of the first converter, and stop the first converter after an output current of the first converter has become less than a predetermined current.

2. The power supply unit according to claim 1, further comprising:
  a first relay configured to enable supply of the power from the power source to the load via the first converter, and enable cut-off of the supply of the power from the power source to the load via the first converter; and
  a second relay configured to enable supply of the power from the power source to the load via the second converter, and enable cut-off of the supply of the power from the power source to the load via the second converter, wherein:
  the electronic control unit is configured to
    in the first control, control the first relay and the second relay such that the power is supplied from the power source to the load via the first converter, and the supply of the power from the power source to the load via the second converter is cut off; and
    in the second control, control the first relay and the second relay such that the power is supplied from the power source to the load via the second converter, and the supply of the power from the power source to the load via the first converter is cut off; and
  the electronic control unit is further configured to
    when shifting from the first control to the second control, control the first converter and the second converter such that the voltage of the load power line becomes the predetermined voltage by driving the second converter while gradually decreasing the output voltage of the first converter in a state where the first relay and the second relay are controlled such that the power is supplied from the power source to the load via the first converter and the second converter; and
    control the first relay such that the supply of the power from the power source to the load via the first converter is cut off after the output current of the first converter has become less than the predetermined current.

3. The power supply unit according to claim 1, wherein:
the power supply unit is mounted on a vehicle; and
the electronic control unit is configured to shift from the first control to the second control at a time when the vehicle is stopped.

* * * * *